United States Patent Office 3,436,349
Patented Apr. 1, 1969

3,436,349
LIQUID DIELECTRIC BLENDS
Sven A. Olund, San Rafael, Calif., assignor to Chevron Research Company, a corporation of Delaware
No Drawing. Filed Nov. 30, 1964, Ser. No. 414,860
Int. Cl. H01b 3/20, 3/22, 3/30
U.S. Cl. 252—63                                    4 Claims

ABSTRACT OF THE DISCLOSURE

A dielectric liquid for use in high-voltage electrical equipment to impregnate insulation, formed by blending an insulating mineral oil characterized by a flash point higher than about 280° F. and a power factor of less than 0.3% at 100° C. with polybutene, the composition being essentially free of ionic impurities.

The present invention is concerned with improved liquid dielectric compositions or blends for use as dielectric fluids or oils, saturants or impregnants for paper or other like pervious insulating materials in the electrical industry, and particularly for use in impregnating the paper and like, insulation of high-voltage equipment, such as cables and capacitors.

The application of liquid dielectrics is well known in the art, the most commonly used ones so far having been mineral (petroleum) oils, followed in recent years by synthetic hydrocarbons, halogenated aromatic hydrocarbons, fluorinated hydrocarbons, silicone oils, and certain other materials.

The choice of a liquid dielectric for a particular use, for instance as an impregnating material for cable insulation, is based on the consideration of a multiplicity of factors, such as the material's own dielectric constant, its power factor and electric strength, as well as limitations of the available space, effect of the particular environment, cost chemical stability, physical properties, such as viscosity, flash point, latent heat of vaporization, etc. In fact, in cables and capacitors the two most important properties which influence the choice of a satisfactory dielectric liquid impregnant are (1) viscosity, and (2) power factor. Too low a viscosity may result in the flow or drainage of the impregnant, such as a petroleum oil, from the insulating medium (paper or the like) and will weaken the effectiveness of the insulation. The power factor whose magnitude is influenced by the movement of ionic materials (impurities) in the liquid impregnant is equally important and is dependent on the viscosity, for the more viscous is the liquid impregnant, the slower is the movement of ionic impurities.

It is now found that a dielectric fluid blend with a greatly improved power factor, as contrasted with the power factors of its individual components and with that of many known liquid dielectrics, can be prepared; that, furthermore, it will possess a viscosity which will make it eminently suitable for use in high-voltage cables and capacitors; and, also, that its use in the cable and capacitor insulation will eliminate in most applications the problem of flow or drainage.

This particular novel blend is formulated by combining an insulating mineral oil, for instance a naphthenic-base petroleum oil, with a liquid polymer of a low molecular weight $C_3$–$C_4$ olefin, whose average molecular weight is at least about 900 and which is compatible with the oil, forming a homogeneous dielectric fluid blend therewith.

Any conventional mineral (petroleum) insulating oil may be used in preparing this blend, provided its flash point is above about 280° F., and preferably above about 300° F., and, furthermore, provided it has a low power factor, preferably below about 0.3%. Naphthenic-base petroleum hydrocarbon oils are particularly preferred.

As to the olefin polymer components, these may be either polypropenes or polybutenes of an average molecular weight from about 900 to about 2,500 and even higher, polybutenes being preferred on account of their excellent oxidation stability. These polybutenes are usually obtained by catalytic polymerization of normal and branched-chain butenes, and their molecules have the form of a long-branched chain with terminal unsaturation only. The preferred polybutenes are permanently fluid, and, if properly freed from impurities, which they usually are, they are chemically inert and display virtually no polarity. The viscosity of these polybutenes suitable for blending with insulating oils in accordance with the present invention ranges from about 3,000 to about 20,000 SSU at 210° F., and their power factor may vary from about 0.10 to about 0.01% at 100° C. and 60 cycles per second (c.p.s.), after aging, depending on the molecular weight of the particular polybutene material.

In order to produce satisfactory dielectric blends of insulating oil and olefin polymer, effective in impregnating cables and capacitors in accordance with the present invention, the two components are blended in any suitable proportions so that the viscosity of the final homogeneous blend will be equal to from at least 150 SSU at 210° F. to as high as 5,000 SSU at 210° F., depending on the particular use and the type of cable and equipment in which the impregnant will be used.

For most practical purposes in making the dielectric blends of the invention, from about 5 to about 50% volume of the polymer will be used, for instance, from about 5 to about 50% by volume of the commercially available polybutene material which is sold in different grades ranging in molecular weight from about 900 and upward.

Mineral insulating oils currently employed in high-voltage equipment under the broad designation of "heavy cable insulating oils" ordinarily, after aging, have power factor values (at 100° C. and 60 cycles per second) of the order of 0.4%. These values are considered, however, to be too high for a number of applications, and discovery of new liquid dielectric impregnants that would have lower power factors is, therefore, eagerly sought. Earlier suggestions have been made in the art to avoid the flow of the impregnant insulating oils from cable insulation by thickening these oils with rosin or with high molecular weight rubbery polyisobutene materials, known in the trade under the trade names of "Vistanex" and "Oppanol." However, dissolution of these materials in the insulating oil presents difficulties, and, in addition, they contain impurities which affect adversely the electrical properties and, in particular, the power factor of the resulting blends with the insulating oils.

It is now found that it is possible, by blending an insulating oil with an olefin polymer in accordance with the invention, to prepare impregnant blends which would have viscosities permitting their use in impregnating the insulation (paper or the like) of cables and capacitors, and that, contrary to what could have been expected, the power factor of these new blends, instead of being approximately equal to the arithmetical sum of the power factors of the oil component and the polymer component, is considerably lower, and this not merely as a matter of degree but actually several fold lower.

Moreover, it is found that even more satisfactory blends, formulated in accordance with the invention, namely, blends with still lower power factors can be obtained by filtering the blends free, or essentially free, of impurities through an adsorbent filtering aid. This can be done, for instance, by percolating such a blend through a clay filter, such as one of the many filtering clays sold under trademark designations of "Filtrol." Likewise, the blend may be percolated through a hydrated amorphous silica, such as the material available in the trade under the trademark "Celite 512." When the blend is so treated, its power factor, as determined by standard testing procedures (namely, in ASTM Test D-924) is even further improved, that is, decreased to a value several times lower than the expected precalculated value obtained by adding the power factor value of the oil and the polymer components of the blend.

Although the filtration treatment may be carried out on each component separately, whereupon the oil and the polymer would be blended into one homogeneous fluid, it is preferred to filter the preformed blend in one single filtration step. This greatly saves the processing time, particularly when one considers that in the case of higher molecular weight olefin polymers, even though they are permanently fluid, percolation through clay or a like filtering aid may take an unduly long time.

The following text describes the preparation of several impregnant blends in conformity with the present invention, and various test data are given with reference to the properties of the individual components of these blends, such as viscosity, power factor, etc., as well as the properties of the blends, both produced without filtration and purified by the filtration treatment. In each test series the properties of the oil, the polymer and the blend were tested in accordance with the established ASTM methods.

A good quality naphthenic-base mineral insulating oil having its viscosity equal to about 35 SSU at 210° F. and found to have a power factor of 0.6% at 210° F. and 60 c.p.s. before aging was blended with a trademarked polybutene material "Polybutene 128" having a viscosity of about 20,000 SSU at 210° F. and a power factor determined under the same conditions as that of the oil (ASTM Test D-924) to be equal to about 0.01%. The viscosity of the blend was 129 SSU at 210° F. The power factor of the blend (12% of the polybutene and 88% of the oil) was found by the same ASTM technique to be equal to 0.11%. This unexpectedly low power factor strikingly illustrates the advantage of blending insulating oils with polybutene according to the invention.

A series of tests was conducted using unfiltered blends of a mineral naphthenic-base insulating oil of marginal quality, the power factor of which was 0.30% before aging and 1.5% after aging, and polybutene, the power factor of which was little less than about 0.01% before aging and about 0.01% after aging. The two blends had different ratios of the oil to the polymer. The viscosity of the oil at 100° F. was equal to 59.3 SSU and to 34.3 SSU at 210° F., while the viscosity of the polymer at 210° F. was equal to 20,100. This is a high molecular weight commercial liquid polybutene sold in the trade under the registered trademark "Oronite Polybutene No. 128E." These two blends—one a blend of 30% polymer and 70% oil (Blend A) and the other a blend of 50% polymer and 50% oil (Blend B)—were tested to determine their power factors. The viscosities and the power factor of these blends before and after aging, compared with the calculated values of the power factor, are shown in the following Table I.

TABLE I

|  | Blend A 30/70 | Blend B 50/50 |
|---|---|---|
| Power Factor in Percent: |  |  |
| Before Aging | 0.097 | 0.054 |
| After Aging 95 hrs. at 115° C | 0.318 | 0.089 |
| Calculated Power Factor in Percent: |  |  |
| Before Aging | 0.212 | 0.152 |
| After Aging | 1.06 | 0.760 |
| Viscosity SSU: |  |  |
| At 100° F | 749 | 5,598 |
| At 210° F | 94.2 | 354 |

The data in Table I indicate that in a 30:70 blend of the polymer and the oil, the power factor after aging is almost three times lower than the arithmetical average value, while in a 50:50 blend, the power factor after aging is almost eight times lower than this value.

When impurities were removed by clay treatment (2% clay), the power factor before aging for the 50:50 blend was equal to about 0.01% and to about 0.02% after aging, as contrasted with the value of about 0.05% before aging and about 0.09% after aging, in the absence of filtration treatment.

Table II illustrates the improvement in power factor values observed in another test series for two blends of a conventional insulating naphthenic-base petroleum hydrocarbon oil and a commercially available high molecular weight liquid polybutene, known in the trade under the designation of "Oronite Polybutene No. 128E" and sold by California Chemical Company, Oronite Division, San Francisco, Calif. Blend A was made up of 92% by volume of the oil and 8% of the polybutene. Blend B was made up of 71% by volume of the oil and 29% of the polybutene.

After blending, the resulting samples to be used in testing were batch-treated by percolating through Florida clay (5% by weight) at 200–210° F. for thirty minutes, and then, after settling, these samples were vacuum-filtered through hydrated silica "Celite 512."

TABLE II

| Property | ASTM Test Method | Polybutene Polymer | Insulating Oil | Blend A | Blend B |
|---|---|---|---|---|---|
| API Gravity, 60° F | D-287 |  | 29.4 | 29.1 | 27.6 |
| Specific Gravity, 60/60° F | D-117 | 0.916 | 0.880 | 0.881 | 0.8894 |
| Viscosity SSU, 100° F | D-445, 446 |  | 59 | 99.0 | 867 |
| Viscosity SSU, 210° F | D-445, 446 | 20,065 | 34.9 | 39.9 | 101.5 |
| Flash Point, °F | D-92 | 525 | 285 | 305 | 300 |
| Fire Point, °F | D-92 | 595 | 315 | 325 | 320 |
| Appearance |  | Bright and clear and free from suspended matter | | | |
| Power Factor in percent 100° C., 60 c.p.s. | D-924 |  |  |  |  |
| Before Aging |  | 0.01 | 0.18 | 0.02 | 0.02 |
| After Aging (96 hrs. at 115° C.) |  | 0.01 | 0.34 | 0.05 | 0.07 |
| Dielectric Strength, 80° C., 60 c.p.s., kv. | D-877 | 35 | 35 | 35 | 35 |

It is plainly seen from the data in Table II that the power factor values of the two blends determined before aging are but 10% of the sum of power factors of the two components, and that after aging, they are about 13–14% for Blend A and about 20% for Blend B. Considering that the power factor values set in the specifications by the industry for cable impregnant fluids are about 0.02 at the maximum before aging, and about 0.1 at the maximum after aging, the superiority of the blends prepared in accordance with the present invention becomes evident. Furthermore, viscosity-wise, the blends also satisfy the requirements of the industry where the specifications call for viscosities of 95–105 SSU (seconds, Saybolt-Universal viscometer) at 210° F., as being desirable for impregnants for use in cable and capacitor insulation.

In another test series, a blend was prepared using an insulating oil, which had a lower power factor as compared with the oil used in the tests of Table II, and the same polybutene as in the preceding examples of Tables I and II. The volume ratio of the oil component to the polybutene in the blend was 70:30, and the blend was percolated through Florida clay at 210° F. (0.15 lb. of clay per one gallon of the blend). The results of this test series are tabulated in the following Table III.

TABLE III

| Property | ASTM Test Method | Insulating Oil | Polybutene | Clay Filtered Blend |
|---|---|---|---|---|
| Viscosity SSU, 210° F | D-245, D-246 | 58.6 | 17,240 | 97.5 |
| Specific Gravity, 60/60° F | D-117 | 0.882 | 0.91 | 0.8871 |
| Flash Point, °F | D-92 | 295 | 450 | 295 |
| Dielectric Strength, 80° C., kv | D-877 | | | 35 |
| Power Factor, 210° F. 60 c.p.s. | D-924 | | | |
| Percent Before Aging | | 0.05 | 0.01 | 0.02 |
| Percent Aged 10 days at 80° C. Air | | 0.07 | 0.01 | 0.03 |

Again, it is noted in the data of Table III that the power factor value determined before aging the blend is three times smaller than the precalculated value (sum of the power factors of the oil and polymer component). Similarly, the power factor value obtained after aging the blend is but 37% of the sum of the oil and polymer components of the blend. Without the filtering treatment of the blend, its power factor after aging was found to be about 0.12%, satisfying the industrial specification for impregnants of cable insulation.

Many more test data could have been adduced to illustrate the improvement in the quality of the liquid impregnants, especially in regard to the greatly reduced value of their power factor, when blended in accordance with the principle of the present invention. However, it is believed that the aforegiven test data are adequately illustrative and amply disclose the advantages gained. In particular, they show that it is possible to provide liquid dielectric impregnants for use in high-voltage cables, capacitors, etc., these impregnants having sufficiently high viscosity to satisfy the demands of the industry, being unsusceptible to the drawback of flow or drainage in actual service and possessing an unexpectedly low power factor (i.e., subject to a low dissipation loss), all of which features make these impregnants eminently suitable for the purposes of the electric power industry.

I claim:
1. A liquid dielectric composition for impregnating pervious insulation of high-voltage equipment, characterized by a viscosity in the range from at least 150 to as high as 5,000 SSU at 210° F., said composition being a blend of insulating mineral oil having its flash point above about 280° F. and a power factor below about 0.3% at 100° C. and 60 cycles per second, with from about 5 to about 50% by volume of polybutene having an average molecular weight of at least about 900 and compatible with said mineral oil, said blend of oil and polybutene being essentially free of ionic impurities, and the power factor of the blend being several times lower than the sum of the respective power factors of its oil and polybutene components.

2. A liquid dielectric composition for impregnating pervious insulation of high-voltage equipment, characterized by a viscosity in the range of at least 150 to as high as 5,000 SSU at 210° F., said composition being a blend of about 5 to about 50% by volume of polybutene of an average molecular weight of at least 900 with an insulating naphthenic-base petroleum hydrocarbon oil as the balance of the blend to make up 100% by volume, this coil being characterized by a flash point of at least 280° F. and a power factor below about 0.3%, said blend being essentially free of ionic impurities.

3. A composition as defined in claim 2, wherein said polybutene has an average molecular weight in the range from at least about 900 to about 5,000.

4. Composition as defined in claim 1, wherein said polybutene has an average molecular weight in the range from about 900 to about 2500.

References Cited

FOREIGN PATENTS 2,127    3/1960    Japan.

OTHER REFERENCES

Chemical abstracts, col. 6217(e), vol. 55 (1961), Insulating Materials for Design & Engineering Practice, p. 135, John Wiley & Sons (1962).

LEON D. POSDOL, *Primary Examiner.*

J. D. WELSH, *Assistant Examiner.*

U.S. Cl. X.R.

252—59; 208—14